United States Patent

[11] 3,601,529

[72] Inventor Robert A. Dischert
Burlington, N.J.
[21] Appl. No. 789,630
[22] Filed Nov. 20, 1968
[45] Patented Aug. 24, 1971
[73] Assignee RCA Corporation
Continuation of application Ser. No. 487,374, Sept. 15, 1965, now abandoned.

[54] COLOR TELEVISION SIGNAL-GENERATING APPARATUS
21 Claims, 14 Drawing Figs.

[52] U.S. Cl. ........................................ 178/5.4 ST
[51] Int. Cl. ........................................ H04n 9/06
[50] Field of Search ........................................ 178/5.4 O, 5.2, 5.4, 5.2 ST; 95/12.21; 350/311, 169, 312

[56] References Cited
UNITED STATES PATENTS
3,015,688 1/1962 Ridgeway ........................ 178/5.4 ST
3,479,450 11/1969 McMann, Jr. ................ 178/5.4 ST

*Primary Examiner*—Richard Murray
*Assistant Examiner*—Alfred H. Eddleman
*Attorney*—Eugene M. Whitacre

ABSTRACT: A color television camera is provided which includes at least one image pickup device. Colored light from a scene is encoded on the photosensitive electrode of the pickup device by an encoding filter having alternate strips of material for separating the light into component colors. The alternate encoding filter strips are selected such that they have equal transmissivity for white light, thereby suppressing the encoded color carrier frequency for white light. Signal processing means separate the color component signals and combine them with a brightness signal to provide signals representative of the color and brightness of the scene.

INVENTOR.
ROBERT A. DISCHERT
BY
W. H. Sprouagle
Attorney

INVENTOR:
ROBERT A. DISCHERT
BY [signature]
Attorney

INVENTOR.
ROBERT A. DISCHERT
BY
W. H. Sprangle
Attorney

INVENTOR.
ROBERT A. DISCHERT
BY
W. H. Spouagle
Attorney

COLOR TELEVISION SIGNAL-GENERATING APPARATUS

This is a continuation of application Ser. No. 487,374, filed Sept. 15, 1965, now abandoned.

BACKGROUND OF THE INVENTION

This invention relates to color television signal-generating systems and particularly to cameras for encoding more than one color on a photosensitive electrode of a pickup tube and systems for processing the encoded signals.

The color television camera which has been most commonly used for many years has three pickup tubes, one for each of three selected component colors of the television subject. In processing the signals derived from such pickup tubes the luminance signal has been produced by combining the outputs of the three pickup tubes. Consequently, in order that a luminance signal be representative of maximum detail, the images on all three of the pickup tubes must be registered with maximum precision. Also, the use of three tubes in a color television camera adds to the size and weight of the camera.

There have been proposals made in the past to use fewer than three pickup tubes for deriving signals representative of all three component colors of the subject. At least one of the pickup tubes in such a system has been provided with optical filters in the form of strips capable respectively of transmitting component colors to selected areas of the photosensitive target of the pickup tube. One such system, for example, is the arrangement shown in U.S. Pat. No. 2,733,291 to R.D. Kell. This arrangement shows an encoding filter having a pattern of alternating transparent and colored strips for encoding a first color and alternating transparent and colored strips of a different color than the first colored strips for encoding a second color. These two alternating strip patterns are so arranged with respect to each other that encoded color signals appear as amplitude modulations of separate carrier frequencies when the photosensitive target is scanned by an electron beam. The carrier frequencies are separated so that the respective encoded color information can be contained in sidebands of the two carrier waves. Provision is made for transmission of a luminance signal through a transparent area of the encoding filter. The luminance signal has a bandpass in the order of 0 to 4 megacycles. Thus, in the Kell arrangement the pickup tube must be capable of resolving a relatively large spectrum of signals in order to yield these separate color and luminance signals.

Another proposal for encoding more than one color on a single pickup tube has been to use an encoding filter having a repetitive pattern of strips of different colors arranged parallel to each other and which filter enables different colors to be encoded on separate areas of the photosensitive electrode of the pickup tube. To separate the different color representative signals derived from a pickup tube used with such an arrangement involves the use of indexing strips interspersed among the color filter strips so that the signals derived from areas of the photosensitive electrode corresponding to the imaged indexing strips may be used to control the operation of such apparatus as synchronous demodulators for separating the color representative signals. Such a system provides color signals which are encoded on various phases of a carrier frequency wave. However, in this system the use of the indexing strips causes a loss of resolution because the indexing strips are not useful themselves to encode colors. Furthermore, in order to insure the generation of signals by use of indexing strips some light must be directed to the pickup tube to ensure the indexing strip pattern is imaged on the photosensitive electrode of the pickup tube at all times independent of scene light. This added light must somehow be removed from the encoded signals during processing, thereby adding to the complexity of the processing circuitry.

It is an object of the present invention therefore to provide an improved and simpler television camera which overcomes the disadvantages of prior art apparatus.

It is another object of the invention to provide a spatial filter for encoding color difference signals.

SUMMARY OF THE INVENTION

In accordance with the invention, a color television camera is provided in which light from a scene to be televised is directed by an optical system to a color-encoding filter positioned so that light passing therethrough is separated into component colors and is imaged onto the photosensitive electrode of a pickup tube. The encoding filter comprises a pattern of strips of material for passing light of one spectral range alternating with strips of material for passing light of a different spectral range. The encoding filter strip material is selected such that the alternate strips have substantially equal transmissivity for white light so that the carrier wave produced as the electron beam scans the photosensitive electrode goes to zero in the presence of white light. The modulation of the carrier wave represents the difference in intensity between the two light components and the total light which may be transmitted by the filter, and is contained in sidebands of a supressed carrier wave. Means are provided for producing signals representative of the brightness of the scene. The encoded component color signals are detected and coupled to suitable means for forming the desired output signal.

In one embodiment of the invention the encoding filter comprises a first set of strips of material for passing light of one spectral range alternating with a second set of strips of material for passing light of a second spectral range. The width of the strips of the first and second sets is unequal whereby the average signals transmitted by each set is unequal, thereby providing signals which may be separated easily by the signal-processing means without the use of indexing strips or an externally generated reference wave. This arrangement thus provides greater resolution than an arrangement utilizing indexing strips and eliminates the need of circuitry for generating a reference wave.

Further, the color-encoding filter provided in applicant's arrangement is a color difference filter with the first and second sets of strips balanced for white light such that the carrier frequency, the sidebands of which are modulated by color difference signals, goes to zero in the presence of white light. This balanced filter arrangement is advantageous in that it does not provide component color signals in the presence of white light when only an average light intensity signal is desired to represent the character of the light reflected from the scene.

In another embodiment of the invention, there is provided a color television camera which employs two image pickup elements and an optical system by which to direct light derived from the subject along paths to the image pickup elements. The light in one of these paths includes at least one of a minimum of three selected primary colors of the subject and the light in the other path includes only that representative of at least two of the other primary subject colors. Optical filter means in the second path is employed to separate the light in that path into two color difference components, at least one of which is representative of a primary color of the subject. As used in the following specification and claims, a primary color is defined as one which, when the signal representing that color is combined with the signals representing all of the other primary colors, produces white but which, when combined with the signals representing all but any one of the other, does not produce a signal representing the one primary color.

In separating the signals derived from the two-component color pickup element into those representing two primary subject colors comparatively simple apparatus such as peak detectors and signal waveform adders are used. These signals then are combined by relatively simple and straightforward matrixing circuit arrangements with the signal derived from the first pickup element to provide the necessary signals such as one representing luminance and two representing color difference signals such as the I and Q components required for transmission according to standards prevailing in the United States.

For a better understanding of the invention reference now will be made to the following description which is taken in conjunction with the accompanying drawings, of which:

Figures 1, 2:
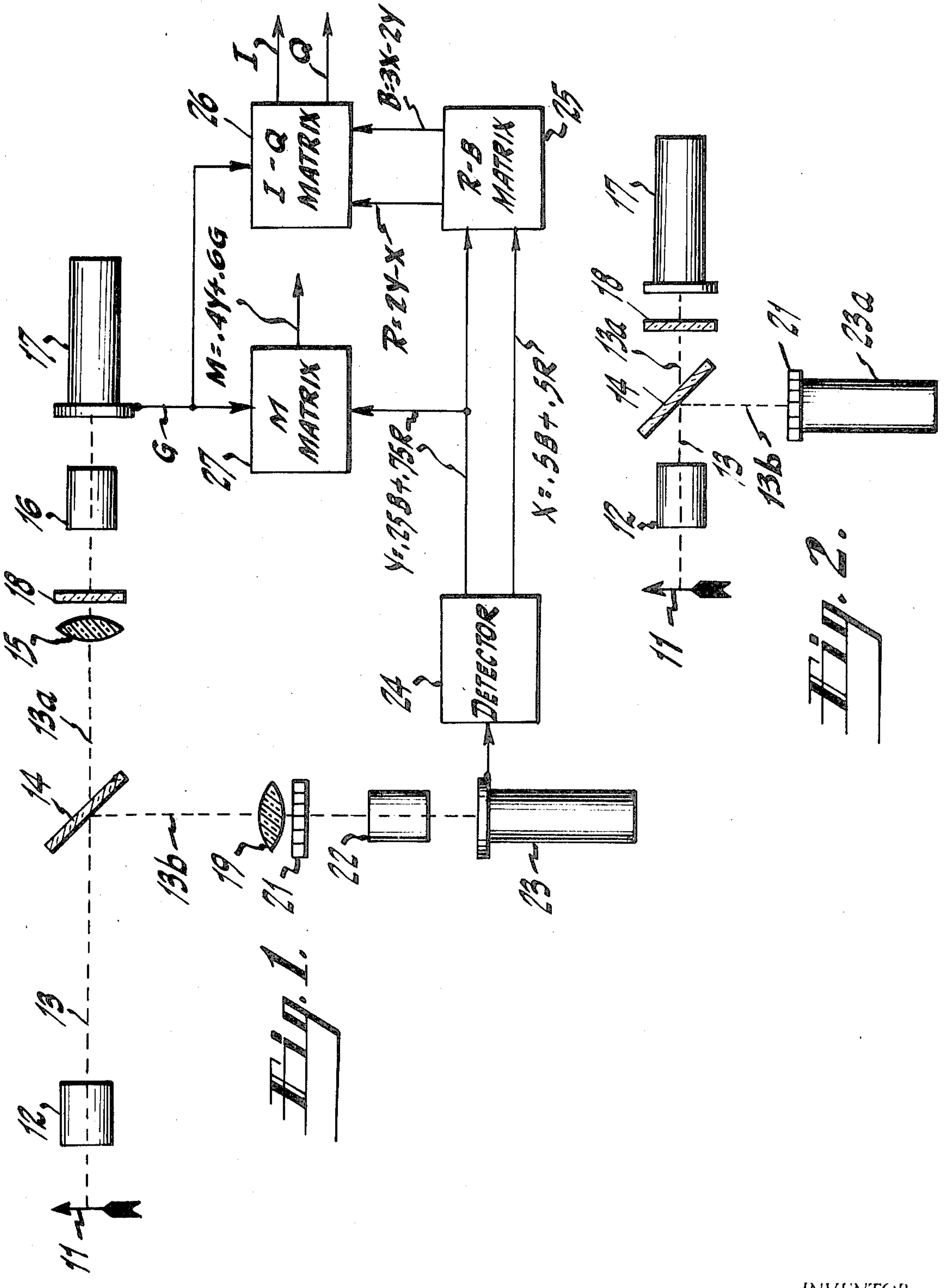
FIG. 1 is a diagrammatic illustration of a color television camera embodying a form of the invention and including the optical apparatus together with a block representation of the essential signal separating and processing circuits.
FIG. 2 is a diagrammatic representation of another form of color television camera using somewhat simpler optical apparatus than that shown in FIG. 1.
Figure 5:
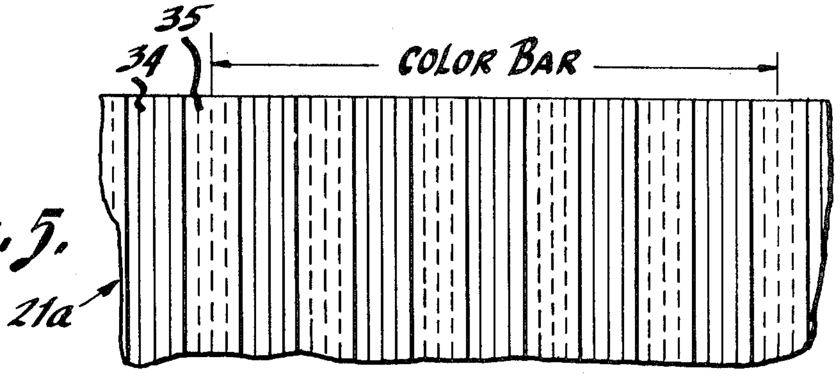
FIG. 5 is a fragmentary illustration to an enlarged scale of another form of a two-color filter in accordance with the invention.

In FIG. 1 colored light from a subject 11 is projected by an objective or taking lens 12 along a path 13 to a light splitter 14 which divides this light into two paths 13*a* and 13*b*. The light splitter 14 preferably is a dichroic mirror which, in an illustrative form of the invention, is capable of transmitting substantially only green light along the path 13*a* and of reflecting substantially only purple or magenta (i.e., red and blue) light along the path 13*b*. An image of the subject 11 is formed in the plane of a field lens 15 included in the green light path 13*a* which is followed in the optical system by a reimaging lens 16. Such an optical system thus forms an image of the subject 11 on the photosensitive electrode of a pickup tube 17. The light path 13*a* may also include a trimming filter 18 so as to insure correct response by the pickup tube to only the green light. The red and blue constituent colors (i.e., purple) of the image 11 are transmitted in the path 13*b* successively by a field lens 19, a strip color filter 21 and a reimaging lens 22 to the photosensitive target of a two-color pickup tube 23. The filter 21 may take various forms, two of which are shown in FIGS. 3 and 5 which will be discussed subsequently.

The signals representative of the purple or magenta light component of the subject 11 derived from the pickup tube 23 are processed by a detector 24, typical forms of which will be described subsequently, to produce signals designated X and Y. The X-signal comprises equal parts of the signals representing the blue and red constituent subject colors and is equal to one-half of the peak-to-peak amplitude of the signal derived from the pickup tube 23. Such a signal is represented by the quantity X=0.5B+0.5R. The Y-signal represents the average value of the signal derived from the pickup tube 23 which, in the form of the filter shown in FIG. 3, comprises one part of blue and three parts of red. Such 0.4Y signal is represented by the quantity Y=0.25B+0.75R. The X and Y signals are combined in a R-B matrix 25 to produce red and blue representative signals R and B, respectively, which are then applied to an I-Q matrix 26. The Y-signal derived from the detector 24 and the green signal G derived from the pickup tube 17 are impressed upon an M or luminance signal matrix 27 for combination to produce a signal representative of the luminance or brightness of the light derived from the subject 11. The matrix 27 combines a quantity 0.4Y with a quantity 0.6G to produce a luminance signal represented by the quantity M=0.1B+0.3R+0.6G. The green signal G also is impressed upon the I-Q matrix 26 for combination in the usual manner with the red and blue signals R and B, respectively, to produce I and Q color differences signals.

Another modification of a color camera arrangement in accordance with the present invention is shown in FIG. 2 in which similar parts are designated by the same reference characters as used in FIG. 1. In this case the optical strip filter 21 is included as part of the pickup tube 23. For example, this filter may be incorporated in the faceplate of the tube and/or placed directly in contact with the photosensitive electrode of the tube. In such an arrangement the optical apparatus may be somewhat simplified by omitting such apparatus as field lenses and reimaging lenses, thereby resulting in shorter optical distances and a more compact camera arrangement.

Figure 3:
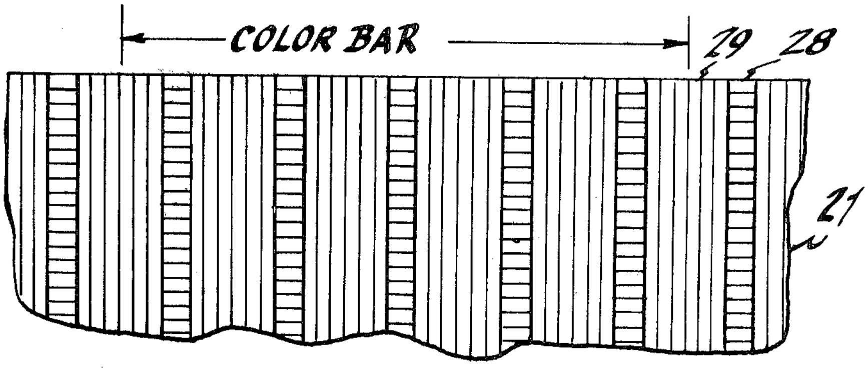
FIG. 3 is fragmentary showing to an enlarged scale of one form of the strip color filter which is used in the two-color channel of the camera.

In FIG. 3 the strip filter 21 comprises alternate strips 28 and 29 capable respectively of transmitting blue and red light. The red strips 29 are three times the width of the blue strips. Both strips, however, are equally transmissive for white light. In other words, where only white light is derived from the subject 11 of FIG. 1 equal quantities of red and blue light are transmitted through the filter strips 28 and 29. Similarly, when the light in the optical path 13*b* is purple or magenta the filter strips have equal transmissivity. In describing the character of the signals derived from the pickup tube 23 when a filter such as shown in FIG. 3 is used, the subject 11 is assumed to be a standard bar pattern commonly used for test purposes in connection with color television apparatus. FIG. 3 illustrates a typical impingement of color bar light upon filter 21.

Figure 4:
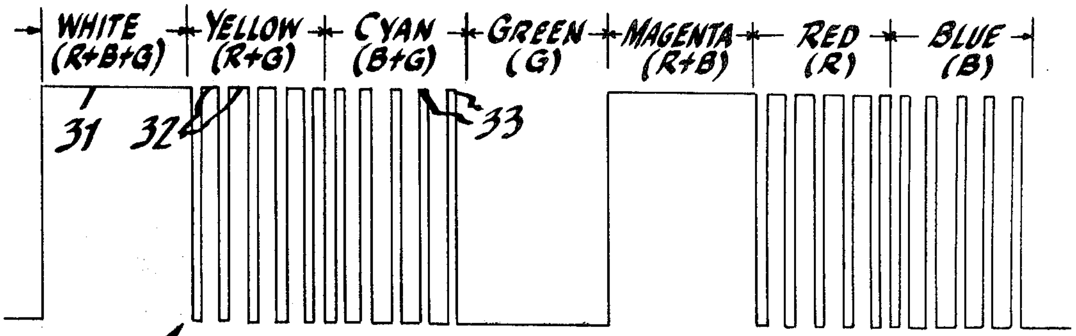
FIG. 4 is the waveform of a typical signal derived from the two-color pickup element when the filter of FIG. 3 is employed.

The signal derived from the two-color pickup tube 23 of FIG. 1 when the filter of FIG. 3 is used, is shown in FIG. 4, assuming that the subject 11 is a standard color bar pattern. With white or magenta light from the subject 11 the signal is a pulse 31 of maximum amplitude. This follows from the fact that equal amounts of red and blue light are transmitted to the pickup tube 23 through the filter 21. When only yellow or red light is transmitted in the optical path 13*b* of FIG. 1, the red light is transmitted at full intensity through the wider red strips 29 and no light is transmitted through the blue strips 28 because there is no blue component in either of such color bars. Consequently, a series of maximum amplitude pulses 32 are produced representing the red light. These pulses are interrupted by the lack of a signal being generated while the beam scans the area behind the blue filter strips 28. When the light from the subject 11 is either cyan or blue, maximum amplitude signal pulses 33 are produced. These pulses are substantially only one-third of the width or time duration of the red representative pulses 32 and are separated by periods of no signal while the scanning beam is traversing areas of the photosensitive electrode behind the red filter strips 29. The manner in which the signal such as shown in FIG. 4 is processed to derive red and blue representative signals and other useful information will be described in detail subsequently in connection with FIG. 7.

Another form of strip filter 21*a* in accordance with this invention is shown in FIG. 5. This filter comprises alternate strips 34 and 35 of equal width capable of transmitting respectively red and purple light from the subject. The purple strip 35 is capable of transmitting red and blue light in equal amounts. Also, the two sets of strips 34 and 35 have substantially equal transmissivity for white light.

Figure 6:
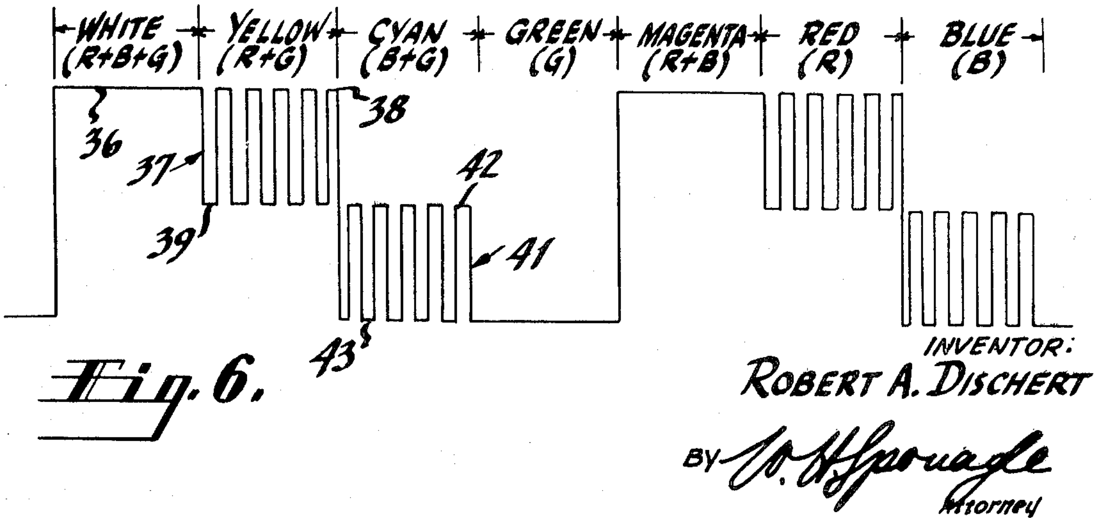
FIG. 6 is the waveform of a typical signal derived from the pickup element when a color filter of the form shown in FIG. 5 is used.

FIG. 6 shows a typical signal derived from the camera apparatus when a filter of the form of FIG. 5 is used and light is derived from a color bar pattern. The signal has maximum amplitude 36 for white or magenta light. For yellow or red light an alternating wave 37 is produced having a positive peak amplitude 38 equal to the maximum amplitude 36 and a negative peak amplitude 39 equal to substantially half of the amplitude 36. When light from the subject 11 is cyan or blue, an alternating wave 41 is produced having a positive peak amplitude 42 equal to substantially one-half the maximum amplitude 36 and a negative peak amplitude 43 of zero. The manner in which this signal is processed to produce color representative and other useful signals will be described subsequently in connection with FIG. 8.

Figure 7:
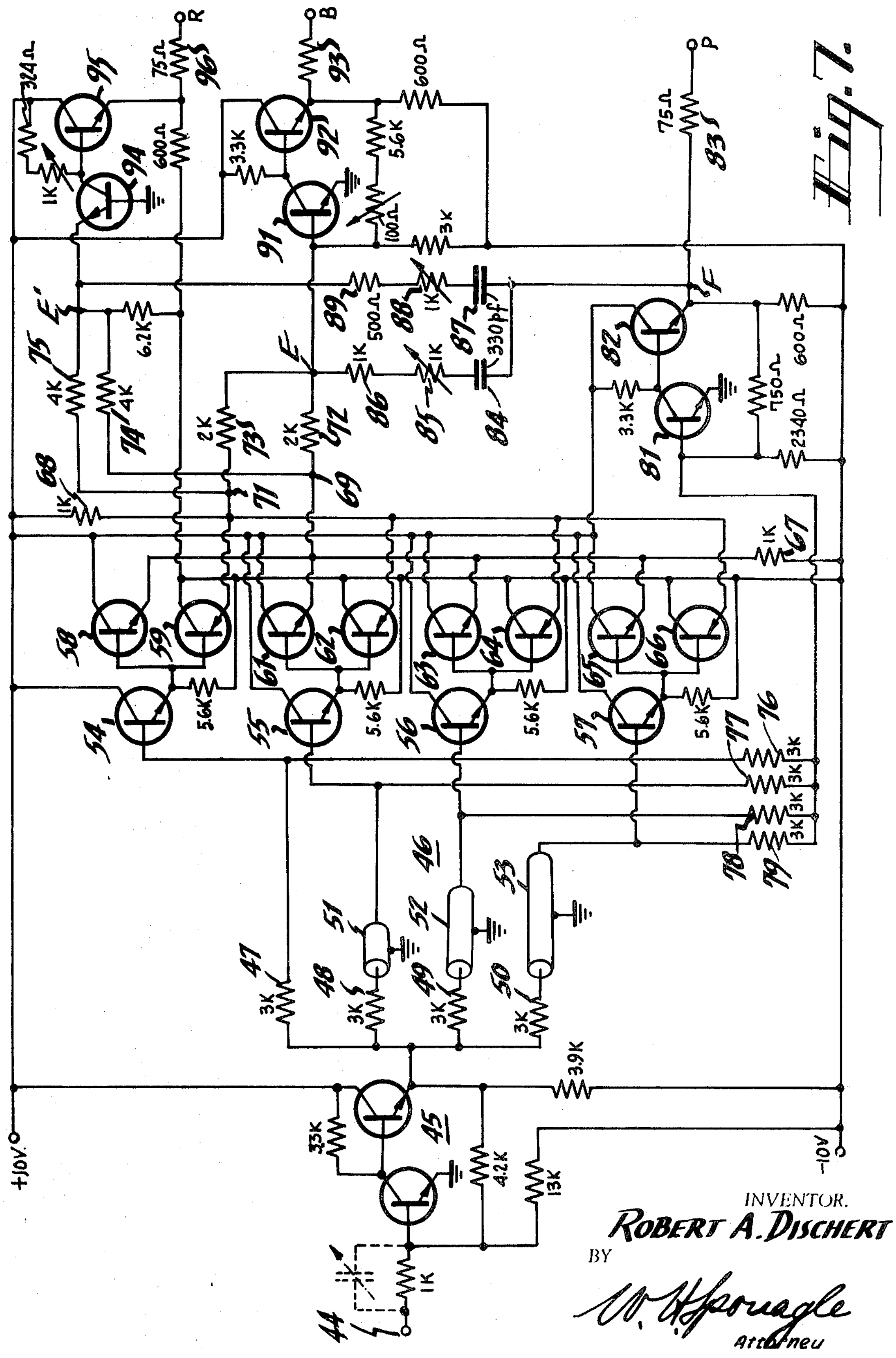
FIG. 7 is a schematic circuit diagram of the signal detector, separating and matrixing circuits used in the two-color channel when a signal of the type shown in FIG. 4 is derived from the two-color pickup device.

The signals derived from either of the two-color pickup tubes 23 or 23a of FIGS. 1 and 2 when a color filter of the type shown in FIG. 3 is used, are developed at an input terminal 44 of the signal separating and matrixing apparatus of FIG. 7. For the purpose of describing the operation of the circuit shown in FIG. 7, it is assumed that the subject 11 of FIG. 1 is a standard color bar pattern which, as previously explained, produces a signal such as that represented in FIG. 4. Such a signal appearing at the terminal 44, is amplified and reversed in polarity by means of a preamplifier 45 comprising a pair of transistors arranged as a feedback pair. The signal derived from the amplifier 45 is impressed upon a distributing network 46 having four branches respectively including resistors 47, 48, 49 and 50. The resistor 47 is the sole component used in the first branch of the network 46. A delay line 51 is connected in series with the resistor 48 in the second branch of the network. Similarly, delay lines 52 and 53 are connected respectively in series with resistors 49 and 50 in the third and fourth branches of the network. The delay lines are of different lengths and are designed so as to effect delays in one or more units of time each equal to one quarter of the time required for the scanning beam of the pickup tube to traverse the target area corresponding to one set of color strips 28 and 29 of FIG. 3. For example, in an embodiment of the invention in which approximately 100 sets of filter strips are used in a system in which a line scanning interval is substantially 53 microseconds, the delay line 51 introduces a delay of 0.125 microseconds, the delay line 52 produces a delay of 0.250 microseconds and the delay line 53 effects a signal delay of 0.375 microseconds. If one considers the signals, produced by the scanning of one target area corresponding to a single pair of filter strips, to be made up of four successive parts each having a time duration equal to that required for the beam to scan an area having the width of a blue filter strip 38, it will be seen that the signals derived from all target areas corresponding to a single set of color filter strips 28 and 29 will be present simultaneously, at the output ends of the four branches of the network 46. Such an arrangement permits one of the signal units to be at a peak level at all times.

Connected to the outputs of the four branches of the network 46 are respective detector driver transistors 54, 55, 56 and 57. Each driver transistor supplies the signal derived from its associated branch of the network 46 to a pair of peak detectors, one for detecting positive signal peaks and the other for detecting negative signal peaks. For example, the driver transistor 54, which is connected in an emitter follower configuration, drives a positive peak detector transistor 58 and a negative peak detector transistor 59. These transistors are of opposite conductivity types so that the transistor 58, for example, responds to positive signal peaks and the transistor 59 responds to negative signal peaks. Similarly, pair of peak detector transistors are provided to respond to signals appearing in the other three branches of the network 46. Specifically, detector transistors 61 and 62 are supplied with signals by the driver transistor 55, detector transistors 63 and 64 are provided with signals by driver transistor 66 and detector transistors 65 and 66 are driven by transistor 57. All of the positive peak detector transistors 58, 61, 63 and 65 are connected as emitter followers and have a common load resistor 67. Similarly, all of the negative peak detector transistors 59, 62, 64 and 66 are connected as emitter followers and have a common load resistor 68.

The peak detectors operate as nonadditive mixers of the signals applied thereto. That is, the positive peak detectors function to produce an output signal across the load resistor 67 which represents that signal, present at a given instant at the outputs of the four branches of the network 46, which has the greatest positive amplitude. Similarly, the negative peak detector transistors produce an output signal across the load resistor 68 which is representative of the greatest negative amplitude of the signals instantaneously present at the outputs of the four branches of the network 46. These detectors function in this manner, by reason of the fact that, when one of a set of them is rendered conducting in response to the maximum signal amplitude, it automatically biases all of the other transistors in the set to a nonconducting state.

As a result of the operation of the peak detectors, there are developed at the detector output points 69 and 71, signals representative respectively of the positive and negative peaks of the signals present at the input terminal 44 as derived from either of the two-color pickup tube 23 and 23a of FIGS. 1 and 2. It will be noted that the polarity of the signal applied to the input terminal 44 is reversed by the preamplifier 45 but no further polarity change is made by any of the driver transistors such as the transistor 54, or any of the peak detectors such as the transistor 58 because all of these devices are operated as emitter followers.

The peak detected signals appearing at points 69 and 71 are combined through resistors 72 and 73 having a common connecting point E. For a color bar pattern type of subject, the signal component derived from the peak detectors and appearing at point E has the form of the wave shown in FIG. 9E. Such a signal is the one previously described as the quantity X=0.5B+0.5R. This signal represents one-half of the peak value of the signals shown in FIG. 4. The peak detected signal has maximum amplitude in response to white and magenta represented bar signals, 50 percent amplitude in response to yellow, cyan, red and blue representative bar signals and zero amplitude in response to green and black representative bar signals. The peak detected signals developed at points 69 and 71 also are combined respectively through resistors 74 and 75, which are connected at a common point E'. The wave form of the signal component derived from the peak detectors and produced at this point is the same as that shown in FIG. 9E, but has an amplitude which is substantially only one-third of the amplitude of the signal produced at the point E.

Figure 9A:
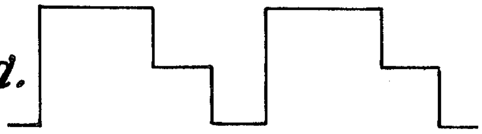
FIGS. 9A through 9F are waveforms of signals appearing at different points of the circuits of FIG. 8 which will aid in an understanding of the operation of the circuit.
Figure 9B:
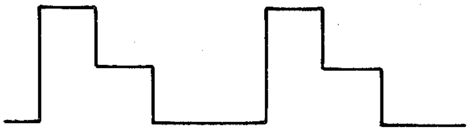
Figure 9C:
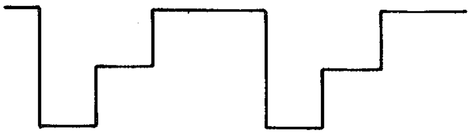
Figure 9D:

The output ends of the four branches of the signal distributing network 46 also are connected through respective resistors 76, 77, 78 and 79 to a common point at the base of an amplifier transistor 81. The resistors 76, 77, 78 and 79 together with the network 46, constitute a low-pass filter by means of which to develop a signal at the base of the transistor 81 representing the average amplitude of the signal wave of FIG. 4. Such an average signal wave which is produced in response to a color bar pattern subject is shown in FIG. 9F. The average signal is the one previously described as represented by the quantity Y=0.25B+0.75R. This wave has maximum amplitude in response to the white and magenta color bar signals and zero amplitude in response to signals representative of green and black portions of the color bar pattern. Since the signal pulses 32 are three times the width of the pulses 33, the average value of the wave in the yellow and red signal section is 75 percent of maximum and the average amplitude of the pulses 33 in the cyan and blue sections is 25 percent of maximum amplitude.

The transistor 81 and another amplifier transistor 82 are arranged in a feedback pair configuration and together effect an amplification and polarity reversal of the signal represented by the waveform of FIG. 9F. Such a signal is developed at the output point F of the amplifier from which it is transferred by a resistor 83 to an output terminal P. Also, the average signal component developed at point F is combined in an R-B matrix now to be described with the peak signal components developed in the manner described as points E and E'. The average signal component wave is impressed upon point E by means of a circuit including a series arrangement of a coupling capacitor 84, an adjustable resistor 85, and a fixed resistor 86. The average signal component at point F similarly, is impressed upon point E' by a circuit which includes coupling capacitor 87, an adjustable resistor 88 and a fixed resistor 89.

Figure 9E:
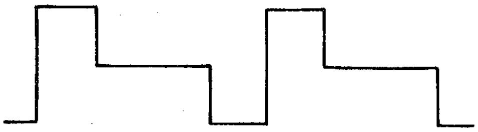
Figure 9F:
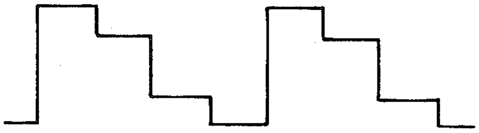

The average signal component wave of FIG. 9F thus is combined with the peak signal component represented by the wave of FIG. 9E in suitable amplitude and polarity for further processing in the matrix to produce red and blue color representative signals. The amplitude of the average signal component wave is substantially the same at both points E and E′ and has a value of two units, for example. The amplitude of the peak signal component wave, as represented in FIG. 9E, is substantially three units at point E and one unit at point E′. The polarity of the average signal components at points E and E′ is the same as that of the signals appearing at input terminal 44. The polarity of the peak signal components appearing at points E and E′ is opposite to that of the signal at input terminal 44. It, thus, is seen that the combined signal at point E is represented by the expression 2Y—3X.

Such a signal is applied to the base of the input transistor 91 of a feedback pair which also includes transistor 92 and constitutes a blue signal output amplifier of the R-B matrix. Such a signal is thereby reversed in polarity in this output amplifier and is represented by the expression 3X—2Y, which is equivalent to the blue representative signal of the subject. This signal is applied by a resistor 93 to the output terminal B of the R-B matrix.

In a similar manner, the combined signal at the terminal E′ is represented by the expression 2Y—X. Such a signal is impressed upon a red signal output amplifier of the R-B matrix comprising transistors 94 and 95, which are connected in a configuration such that the polarity of the output signal is the same as that of the input signal. Such a signal represents the red component color of the subject and is applied through a resistor 96 to an output terminal R of the R-B matrix.

Figure 8:
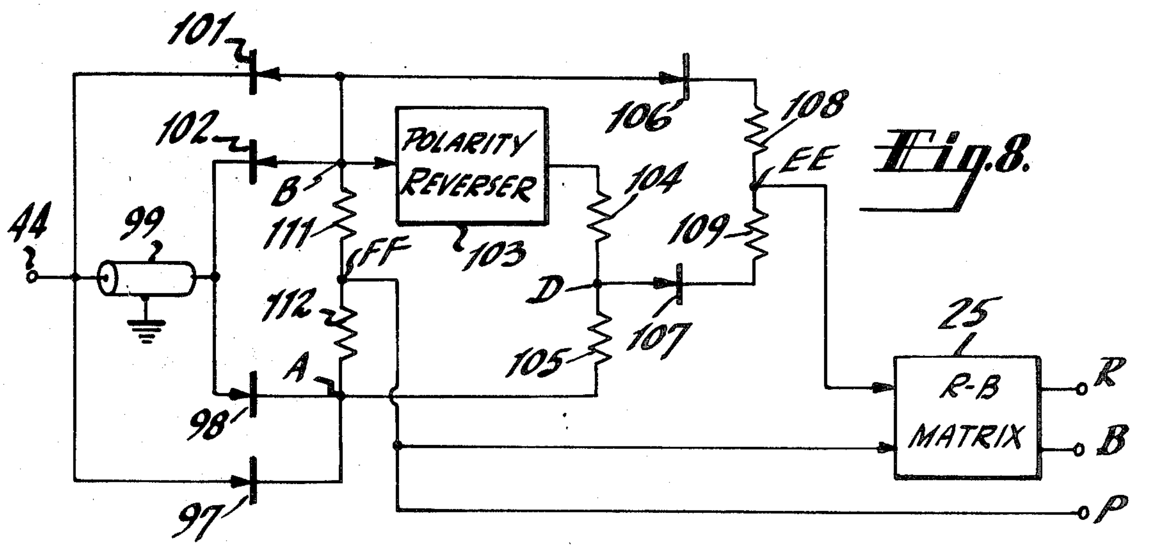
FIG. 8 is a schematic circuit diagram, partly in block form, of the signal separating circuit used when a signal of the form shown in FIG. 6 is derived from the two-color pickup tube.

When the pickup tube 23 of FIG. 1, or the tube **23*a* of FIG. 2 is equipped with a color filter of the type shown in FIG. 5 to produce signals such as shown in FIG. 6 in response to a color bar pattern type of subject, a detector circuit such as shown in FIG. 8 is used to provide the required separation of the blue and red signals. The signal derived from the two-color pickup tube which appears at terminal 44 is impressed upon a pair of positive peak detector diodes 97 and 98 by means including a delay line 99 so as to effect substantial coincidence of the signals derived form the pickup tube target areas corresponding to the red and purple color strips 34 and 35 of FIG. 5. These signals also are impressed by means including the delay line 99 upon a pair of negative peak detector diodes 101 and 102. When a filter having approximately 100 pairs of strips is used, the delay line 99** is of such a character to effect a delay of substantially 0.250 microseconds of the signals transmitted therethrough.

The diodes 97, 98, 101 and 102 comprise positive and negative nonadditive mixers of the signals impressed thereon. These diodes function in the same general manner as the peak detector transistors of FIG. 7. There is, thus, produced at the point A at the output of the positive peak detectors 97 and 98 a wave such as that shown in FIG. 9A representing the positive peak amplitudes of the signals shown in FIG. 6. Similarly, at point B at the output of the negative peak detector diodes 101 and 102, there is produced the wave shown in FIG. 9B representing the negative peak amplitudes of the signal of FIG. 6. The negative peak wave is impressed upon a polarity reverser 103 to produce a reversed polarity negative peak wave such as shown in FIG. 9C. This wave is combined by means including resistors 103 and 105 with positive peak wave shown in FIG. 9A and developed at point A to produce a wave at point D having the configuration of the wave shown in FIG. 9D. This latter wave then is nonadditively mixed with the negative peak wave of FIG. 9B by means including diodes 106 and 107 and resistors 108 and 109 so as to produce a peak signal component wave at point EE such as shown in FIG. 9E. It will be noted that this wave is the same as that produced by the apparatus of FIG. 7 and is represented by the quantity X=0.5B+0.5R. This X-signal component is impressed upon an R-B matrix 25 for further processing and combination with a Y-signal component representing the average value of the wave of FIG. 6.

Such a component wave representing the average value of the FIG. 6 signal is produced by means including resistors 111 and 112 connected between the positive and negative output points A and B of the two nonadditive mixers coupled to the input terminal 44. There is, thus, produced at the common terminal FF of the two resistors a component wave having the form shown in FIG. 9F representing the average value of the signal of FIG. 6. It is to be noted that this average value wave is the same as that produced by the apparatus of FIG. 7 and is represented by the quantity Y=0.25B+0.75R. Such a component wave is applied to the R-B matrix 25 where it is combined with the peak signal component wave X in a manner similar to that shown in FIG. 7 so as to produce at the output of the matrix a red signal at terminal R and a blue signal at terminal B. The average signal component wave Y also is brought out to a terminal P as in the apparatus of FIG. 7 from which it is connected to the M matrix 27 of FIG. 1 for combination with the green signal G in the manner previously described to produce a luminance signal represented by the quantity M= 0.1B+0.3R+0.6G.

Not only does the present invention provide a simpler and less bulky color television camera than those presently in use and enables the use of simpler signal-separating circuits, but also a number of other advantages are secured. Because all of the high-frequency information is derived from the single-color pickup tube responsive to the green color component of the subject, it is only necessary to provide aperture correction for the green channel signal. Also, by reason of the fact that the signals representing the two other colors, such as red and blue, are derived from the two-color pickup tube, any gamma correction of the red and blue signals necessarily is the same on account of the pickup tube being operated at the same point on its characteristic curve for both color signals. The use of a single gamma corrector in the tow-color channel and a similar gamma corrector in the green signal channel assures gamma tracking for gray signal information.

Furthermore, in the case where the shading characteristics of the two pickup tubes are similar, any color signal shading will be completely cancelled out. Any luminance signal shading will be that corresponding to the average shading of the two pickup tubes. A system, such as that disclosed as illustrative of the present invention operates as a two-color system for the luminance signal channel; one color is green and the other color is purple. The signals derived from the purple channel comprise relatively narrow band information representing the blue and red color components of the subject. Hence, any loss of resolution because of the use of the color strip filter will produce no color errors in the signals representative of white portions of the subject. In any area of the subject where the strip filter pattern information is lost, the camera system, in accordance with the invention, reverts to an operation comparable to a two-color system. In such an event, the high-frequency information may be considered as producing a color difference signal represented by the quantity B-R.

What is claimed is:

1. In a color television camera for generating a plurality of signals respectively representing *n* selected primary colors of a subject, said primary colors being such that any combination of the signals representing *n*—1 of said colors cannot produce the signal representing the remaining color and the combination of the signals representing all of said colors produces a signal representing white, the combination comprising:

first and second pickup elements for producing image representative signals;

means for directing light derived from said subject along one path to said first pickup element and along another path to said second pickup element;

the light in one of said paths including at least one of said primary colors of said subject and the light in the other of said paths including at least two of the other primary colors of said subject, light-dividing means in said other light path to separate the light in said other path into two different color components;

peak detector means coupled to said second pickup element for separating signals therefrom into two different color component signals; and signal adder means coupled to said first pickup element and to said peak detector means for combining the output signals from said first and second pickup elements to produce signals representative of the *n* primary colors of said subject.

2. In a color television camera, the combination as defined in claim 1, wherein said light-dividing means is of such a character that at least one of said two different color components is a second one of said primary colors of said subject.

3. In a color television camera for generating signals respectively representative of three selected primary colors of a subject, said primary colors being such that the combination of no two of them can produce the third and the combination of all three of them produces white, the combination comprising:

first and second pickup elements for producing image representative signals;

means for directing light derived from said subject along one path to said first pickup element and along another path to said second pickup element, the light in one of said paths including at least one of said primary colors of said subject and the light in the other of said paths including only the other two primary colors of said subject, means in said other light path to separate the light in said other path into two different color components at least one of which is a second one of said three primary colors of said subject;

peak detector means coupled to said second pickup element for separating signals therefrom into two different color component signals; and signal adder means coupled to said first pickup element and to said peak detector means for combining the output signals from said first and second pickup elements to produce signals representative of the *n* primary colors of said subject.

4. In a three-color television camera, the combination comprising:

first and second pickup tubes for producing image representative signals;

means for directing light derived from a subject along one path to said first pickup tube and along another path to said second pickup tube, the light in one of said paths including at least one of the three constituent colors of said subject and the light in the other of said paths including only the other two constituent colors of said subject; and means in said other light path to separate the light in said other path into two different color components at least one of which is a second one of the three constituent colors of said subject;

means including peak detectors coupled to said second pickup tube for separating the signals therefrom into two different color component signals; and means including signal adders coupled to said first pickup tube in said one light path and to said peak detectors in said second light path for combining the output signals from said first pickup tube and said two different color component signals to produce signals representative of the three constituent colors of said subject.

5. In a three-color television camera, the combination as defined in claim 4, wherein the light in said one path includes at least the green light constituent of said subject and the light in said other path includes only the red and blue light constituents of said subject.

6. In a three-color television camera, the combination as defined in claim 5, wherein the light in said other path is separated into (1) the red light constituent of said subject and (2) a color component comprising a combination of the red and blue light constituents of said subject.

7. In a three-color television camera, the combination as defined in claim 5, wherein the light in said other path is separated into the red and blue light constituents of said subject.

8. In a color television camera, the combination according to claim 1 wherein:

said means for directing light from a subject includes a dichroic light divider for directing green light derived from a subject to said first pickup element and for directing purple light from said subject to said second pickup element; and said light-dividing means in said other path includes a light filter, said filter comprising alternate strips to separate said purple light into two different color components.

9. In a color television camera, the combination as defined in claim 8, wherein said light filter strips are transmissive respectively of (1) said red light and (2) a combination of said red and blue light derived from said subject.

10. In a color television camera, the combination as defined in claim 8, wherein said light filter strips are transmissive respectively of said red and blue light derived from said subject.

11. In a color television camera, the combination according to claim 8 wherein said light filter is a color-separating filter located at an image plane in said other light path, said filter having alternating zones having substantially equal transmissivity for white light and capable respectively, of transmitting (1) light of a first one of said two component colors and (2) light including at least that of the second one of said two component colors.

12. In a two-tube three-color television camera, a color-separating filter as defined in claim 11, wherein one of said alternating zones has a width equal to several times the width of the other of said zones, said wide zones being transmissive of light of substantially only said first one of said two component colors and said narrow zones being transmissive of light of substantially only said second one of said two component colors.

13. In a two-tube three-color television camera, a color-separating filter as defined in claim 11, wherein said alternating zones are of equal widths, one set of said zones being transmissive of light of substantially only said first of said two component colors and the other set of said zones being transmissive of light of a combination of both of said two component colors.

14. A color television signal-generating system, comprising:

a first pickup tube responsive to a first sample of light derived from a subject and including at least one of three constituent subject colors to produce a first signal continuously representative of said first light sample;

a second pickup tube responsive to a second sample of light derived from said subject and consisting of the other two of said constituent subject colors to produce a wave including an alternating component modulated to represent said second light sample;

means for producing a second signal representative of the peak-to-peak amplitude of said wave;

means for producing a third signal representative of the average amplitude of said wave; and means for combining said second and third signals in a manner to produce signals continuously representative respectively of the light derived from said subject consisting of said two other constituent colors.

15. A color television signal-generating system, comprising:

a first pickup tube responsive only to the green light derived from a subject to produce a first signal continuously representative of said green light;

a second pickup tube responsive only to the purple light derived from said subject to produce a wave including an alternating component modulated to represent said purple light;

means for producing a second signal representative of the peak-tohpeak amplitude of said wave;

means for producing a third signal representative of the average amplitude of said wave;

means for combining said second and third signals in suitable amplitudes and polarities to produce signals continuously representative respectively of the red and blue light derived from said subject; and means for combining said first and third signals in suitable amplitudes and polarities to produce a signal representative of the brightness of the light derived from said subject.

16. A color television signal generating system as defined in claim 15, wherein alternate half-cycles of said alternating component produced by said second pickup tube represent respectively the red and blue light derived from said subject.

17. A color television signal generating system as defined in claim 15, wherein alternate half-cycles of said alternating component produced by said second pickup tube represent respectively (1) the red light and (2) a combination of the red and blue light derived from said subject.

18. A color television signal-generating system comprising:

a first pickup tube responsive only to the green light derived from a subject to produce a first signal continuously representative of said green light;

a second pickup tube responsive only to the purple light derived from said subject to produce an alternating wave modulated to represent said purple light, alternate half-cycles of said wave representing respectively the red and blue light derived from said subject, the time duration of said red representative half-cycles being substantially three times the time duration of said blue representative half-cycles;

means including a positive peak detector for producing a second signal continuously representative of the positive peak amplitude of said modulated wave;

means including a negative peak detector for producing a third signal continuously representative of the negative peak amplitude of said modulated wave;

means for adding said second and third signals to produce a fourth signal continuously representative of substantially one-half of the peak-to-peak amplitude of said modulated wave;

means including a low-pass filter for producing a fifth signal continuously representative respectively of the red and blue light derived from said subject; and means for combining said first and fifth signals in suitable amplitudes and polarities to produce a signal representative of the brightness of the light derived from said subject.

19. A color television signal-generating system, comprising:

a first pickup tube responsive only to the green light derived from a subject to produce a first signal continuously representative of said green light;

a second pickup tube responsive only to the purple light derived from said subject to produce a wave having an alternating component modulated to represent said purple light, alternate half-cycles of said alternating component being of substantially equal time duration and representing respectively the red and purple light derived form said subject;

means including a positive peak detector for producing a second signal continuously representative of the positive peak amplitude of said wave;

means including a negative peak detector for producing a third signal continuously representative of the negative peak amplitude of said wave;

means for subtracting said third signal from said second signal to produce a fourth signal continuously representative of the peak-to-peak amplitude of said alternating component;

means for nonadditively combining said third and fourth signals in positive polarity to produce a fifth signal continuously representative of substantially equal parts of the red and blue light derived from said subject;

means including a low-pass filter for producing a sixth signal continuously representative of the average amplitude of said wave;

means for combining said fifth and sixth signals in suitable amplitudes and polarities to produce signals representative respectively of the red and blue light derived from said subject; and means for combining said first and sixth signals in suitable amplitudes and polarities to produce a signal representative of the brightness of the light derived from said subject.

20. In a color television system, a camera for producing color signals representative of a scene to be televised comprising:

at least one image pickup device having a photosensitive electrode and a signal output electrode;

light-filtering means disposed in the optical path of said camera ahead of said image pickup device including a color difference encoding filter having a pattern of strips of one color alternating with strips of another color for respectively passing light of different spectral ranges, the material of said alternating strips being selected such that said alternating strips have substantially equal transmissivity for white light, for encoding said light of different spectral ranges on separate areas of said photosensitive electrode and for producing modulation of a carrier wave at said output electrode of said pickup tube as said photosensitive electrode is scanned by an electron beam, said carrier wave being suppressed in the presence of white light;

means for producing signals representative of the brightness of said scene; and means coupled to said brightness signal means and to said output electrode for processing said brightness signals and said encoded color signals to yield signals representative of the brightness and color of said scene.

21. A spatial color-encoding filter for encoding light passing therethrough as a color difference, an image of which encoded light when scanned yields a composite signal including a carrier wave representative of said color difference and which carrier wave is suppressed in the presence of white light, comprising:

a first set of strips of material for passing light of one spectral range alternating with a second set of strips of material for passing light of a different spectral range, the material of said first and second sets of strips being selected such that said first and second set of strips have equal transmissivity for white light whereby no modulation of said light passing through said filter occurs when said light is white.

UNITED STATES PATENT OFFICE
CERTIFICATE OF CORRECTION

Patent No. 3,601,529 Dated August 24, 1971

Inventor(s) Robert A. Dischert

It is certified that error appears in the above-identified patent and that said Letters Patent are hereby corrected as shown below:

Column 3, line 69, that portion reading "0.4Y" should read -- a --.
Column 5, line 41, that portion reading "38" should read -- 28 --.
Column 7, line 41, that portion reading "form" should read -- from --; line 62, that portion reading "103" should read -- 104 --.
Column 8, line 34, that portion reading "tow" should read -- two --.
Column 11, line 62, that portion reading "form" should read -- from --.

Signed and sealed this 11th day of April 1972.

(SEAL)
Attest:

EDWARD M.FLETCHER,JR.
Attesting Officer

ROBERT GOTTSCHALK
Commissioner of Patents